US009415628B2

(12) United States Patent
Kia et al.

(10) Patent No.: US 9,415,628 B2
(45) Date of Patent: Aug. 16, 2016

(54) LIGHT-WEIGHT VEHICLE WHEELS WITH CARBON FIBER INSERTS

(75) Inventors: Hamid G. Kia, Bloomfield Hills, MI (US); Michael J. Irwin, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 1003 days.

(21) Appl. No.: 13/469,378

(22) Filed: May 11, 2012

(65) Prior Publication Data

US 2013/0026816 A1   Jan. 31, 2013

Related U.S. Application Data

(60) Provisional application No. 61/512,460, filed on Jul. 28, 2011.

(51) Int. Cl.
| | |
|---|---|
| *B60B 21/00* | (2006.01) |
| *B60B 1/14* | (2006.01) |
| *B60B 3/10* | (2006.01) |
| *B60B 3/12* | (2006.01) |
| *B60B 5/02* | (2006.01) |
| *B60B 7/01* | (2006.01) |
| *B60B 7/04* | (2006.01) |

(52) U.S. Cl.
CPC ... *B60B 1/14* (2013.01); *B60B 3/10* (2013.01); *B60B 3/12* (2013.01); *B60B 5/02* (2013.01); *B60B 7/01* (2013.01); *B60B 7/04* (2013.01); *B60B 2310/316* (2013.01); *B60B 2360/102* (2013.01); *B60B 2360/104* (2013.01); *B60B 2360/106* (2013.01); *B60B 2360/36* (2013.01); *B60B 2360/362* (2013.01); *B60B 2900/311* (2013.01); *Y10T 156/103* (2015.01)

(58) Field of Classification Search
CPC ........ B60B 1/06; B60B 5/02; B60B 2360/36; B60B 3/10; B60B 3/12; B60B 7/04; B60B 7/061; B60B 7/065
USPC .................... 301/104, 37.101, 37.102, 37.11, 301/37.106, 37.107, 37.42, 37.43, 64.101, 301/64.102, 64.703, 64.704, 64.705, 95.102
See application file for complete search history.

(56) References Cited

U.S. PATENT DOCUMENTS

| | | | | |
|---|---|---|---|---|
| 4,256,348 | A * | 3/1981 | Lester et al. | 301/63.103 |
| 4,294,490 | A * | 10/1981 | Woelfel | 301/64.703 |
| 4,943,139 | A * | 7/1990 | Bacon et al. | 359/538 |
| 5,415,463 | A * | 5/1995 | Olson et al. | 301/64.702 |
| 5,915,796 | A * | 6/1999 | Beyer | 301/59 |
| 6,517,166 | B1 * | 2/2003 | Chen | 301/37.108 |
| 7,361,296 | B2 * | 4/2008 | Adrian | 264/257 |
| 8,864,242 | B2 * | 10/2014 | Mengle et al. | 301/37.107 |

(Continued)

*Primary Examiner* — S. Joseph Morano
*Assistant Examiner* — Jean Charleston
(74) *Attorney, Agent, or Firm* — Reising Ethington P.C.

(57) ABSTRACT

Application of carbon fiber reinforced polymer structures to metal vehicle wheels is effective in reducing the mass of the wheel while retaining suitable stiffness in the wheel structure. For maximum effect the reinforced polymer structure and the metal wheel must operate cooperatively. Because of the wide range of operating temperatures experienced by wheels and the large difference in coefficient of thermal expansion between metals and carbon fiber reinforced composites attachment of the polymer structure to the wheel by adhesive alone is problematical. However a wheel with an effective and durable reinforcement may be fabricated by confining, through mechanical interference, the reinforced polymer in a cavity in or on the spoke and by preheating the wheel before curing the polymer.

14 Claims, 5 Drawing Sheets

(56) References Cited

U.S. PATENT DOCUMENTS

| | | | |
|---|---|---|---|
| 2005/0253446 A1* | 11/2005 | Okajima | 301/58 |
| 2007/0176482 A1* | 8/2007 | Culiver, III | 301/110.5 |
| 2011/0101768 A1* | 5/2011 | Schlanger | 301/56 |
| 2013/0057050 A1* | 3/2013 | Matsui et al. | 301/95.102 |

* cited by examiner

LIGHT-WEIGHT VEHICLE WHEELS WITH CARBON FIBER INSERTS

This application claims priority based on provisional application 61/512,460, titled "Light-Weight Vehicle Wheels with Carbon Fiber Inserts," filed Jul. 28, 2011, and which is incorporated herein by reference.

TECHNICAL FIELD

This invention relates to the manufacture and processing of automotive vehicle wheels fabricated to have radial spokes connecting the rim and hub portions of the wheels. More specifically this invention relates to the use of carbon fiber reinforced segments on the spokes and hub surfaces of cast aluminum wheels to improve their stiffness.

BACKGROUND OF THE INVENTION

Wheels for automotive vehicles are typically made of suitably strong and durable metal alloys. They usually comprise a hub for attachment to a vehicle axle and/or braking mechanism, and a rim for carrying a specified vehicle tire, typically a pneumatic tire. The hub and rim are often connected by a suitable number of radial spokes. The wheel has an inner side facing the vehicle structure to which it is attached, and an outer side visible to a viewer. In addition to its structural function, the visible side of the wheel may be designed for an intended visual effect for enjoyment by the owner or other viewer.

Both for appearance and to maximize air flow to the brakes, automobile wheel styling has tended to emphasize open designs in which the tire-bearing rim is supported on slender spokes or columns connecting the rim to the hub. This design is particularly prevalent for lighter weight alloy (aluminum or magnesium) wheels and conveys the additional benefit of further reducing wheel mass.

The number and cross-section of the spokes is dictated by both structural and aesthetic considerations, leading to a wide range of wheel and spoke designs. In some wheels the spokes are solid with a cross-section which may be generally rectangular, triangular, trapezoidal or oval. Such solid spokes may be of uniform or variable section along their length and in some designs a single spoke at the hub may be split into two spokes of smaller cross-section at the rim. In other wheels the spoke, at least in part, has the form of a channel section, which, in cross-section, may resemble a "C" or a "U". Some wheels may employ only a single spoke design, but wheels employing more than one spoke design, alternating in regular pattern around the wheel may also be found.

Irrespective of the spoke design or configuration, in vehicle use, these spokes will repeatedly flex under the bending loads applied during cornering maneuvers. Such deflections can affect wheel lateral stiffness which could result in poorer ride comfort. Considerable attention is therefore directed to ensuring that the spokes are suitably stiff under bending loads to limit flexure to acceptable levels. But since the spoke stiffness, for a given material, will be determined by the spoke section, increasing spoke stiffness often results in a higher than preferred mass.

There is therefore interest in alternative approaches to achieving low mass spoked wheel designs with acceptable spoke stiffness.

SUMMARY OF THE INVENTION

In accordance with embodiments of this invention, a vehicle wheel is formed that comprises a designed combination of metal alloy portions and portions of a carbon fiber-themoset polymer composite. In many embodiments of the invention, a suitable metal alloy, such as an aluminum alloy, is cast or otherwise shaped to form major portions of the hub, spokes, and rim of the wheel as a unitary structure. But molded-in-place and cured-in-place carbon fiber-polymer composite body portions are incorporated into predetermined, preformed, complementary recesses in the metal structure so as to strengthen portions of the wheel structure. Often the carbon fiber-polymer composite body portions will be incorporated into the spokes of the wheel. Wherever located in the metal structure of the wheel, each preformed recess is shaped to engage and confine enough of the molded-in-place polymer body to retain it under compression within the metal structure throughout the operating life of the wheel. Preferably, for example, the metal portion is heated to about the molding and curing temperature of the carbon fiber-polymer composite such that during subsequent cooling of the wheel structure the metal portion shrinks against portions of the molded-in composite body.

Thus, the overall shape of the wheel is of a modern, durable and aerodynamic design, but major structural portions of the wheel are formed of metal, and supporting structural portions are formed of held-in-place carbon fiber-themoset polymer bodies. The composite polymer bodies may be located for structural reasons in the design and making of the wheel. But in many embodiments it may be preferred to also locate the composite polymer bodies on outer surfaces of a wheel for their visual effect.

The substitution of carbon fiber reinforced composite material for aluminum in stiffness limited structures is mass-effective, yielding increased stiffness for lower mass. As an example, a plain-weave carbon fiber reinforced laminate may have an elastic modulus of approximately $6 \times 10^6$ psi and a specific gravity of 1.33, just about one-half of the specific gravity of aluminum (2.71). Although at about $10 \times 10^6$ psi, the modulus of aluminum is higher, even this basic plain-weave carbon-fiber composite has a stiffness to weight ratio, relative to aluminum of about 1.18. Thus substitution of a carbon fiber reinforced polymer composite for aluminum can enable mass reduction and so incorporation of such a carbon fiber reinforced polymer composite in the spokes of an aluminum wheel can be effective in reducing wheel mass without detriment to its performance.

In an embodiment, the spokes of a one-piece cast or forged, spoked aluminum wheel are stiffened by attachment of a woven carbon fiber reinforced composite body or shell attached to the exterior, or customer-viewable, surface of the spoke. A similar woven carbon fiber reinforced shell may be applied to the hub. A suitable woven carbon fiber reinforcement may contain tows, or assemblages of continuous or near-continuous, untwisted fibers loosely gathered together and generally elliptical in cross-section, optionally, lightly secured using an epoxy sizing. Such tows may then be woven into any desired 2-dimensional pattern to form a reinforcing fabric or sheet. Each tow may contain from about 1,000 to 50,000 thousand fibers of between 10 and 20 micrometers in diameter. In typical weave patterns adjacent parallel tows may be spaced between 1 and 5 millimeters apart. Typically the composite will incorporate a plurality of layers of such woven carbon fiber reinforcements.

For ease and speed of installation a suitable number of reinforcements, cut to size, may be stacked and impregnated with a resin polymer precursor to form a prepreg. The orientation of the woven carbon fiber reinforcements may be adjusted to optimize stiffness and the visible, topmost layer of the stack may be suitably oriented to present a pleasing appearance to a customer.

Suitable aluminum alloys include magnesium-silicon alloyed aluminum alloy 6061 and the primarily magnesium alloyed aluminum alloy 5454. The composite shell is cured-in-place in a cavity or recess and retained by inwardly-inclined flanges or similar design features which generate a mechanical interference with the shell. The nature of the inwardly-inclined flanges may dictate that they be formed by machining or some other secondary wheel shaping operation since they may interfere with the proper opening of the die after the cast wheel has solidified or with proper release of the forging die during fabrication of forged wheels.

Mechanical interference, between the composite shell and the flanges may be assured by properly sizing the composite precursor and by curing-in-place. The prepreg should be accurately sized since inserting the prepreg into the cavity will require that it be guided under the inwardly-inclined flanges and tamped into position to fill the cavity. To confer a consistent and pleasing appearance to each spoke to which the shell is applied, not only should the weave of the topmost visible reinforcement layer be oriented consistently as noted previously but the prepreg must be inserted in the spoke cavity without distorting the shape or orientation of the weave. This requirement also mandates a consistent and predetermined prepreg dimension which may be most readily assured by die cutting the prepreg, but automated, computer numerically controlled (CNC) cutting machines similar to those employed by the garment industry may also be used.

Curing occurs at elevated temperature of between about 100° C. and 150° C. so that on cooling from the elevated curing temperature the greater coefficient of thermal expansion of the aluminum (about $22 \times 10^{-6}$/K) relative to the composite (about $2 \times 10^{-6}$/K) will induce opposing flange walls to convey a compressive stress to the shell. By selecting a cure temperature greater than the maximum expected operating temperature of the wheel, a compressive stress may be maintained under all operating conditions. However to ensure that the compressive stress is elastic and not plastic, which would lead to a permanent expansion of the cavity, the selected curing temperature should be informed by the strength of the aluminum alloy. For many alloys a suitable curing temperature may be about 120° C. or less.

To further enhance retention of the shell, the shell-contacting the portion of the spoke may be curved concave outward. Under application of a compressive stress, for example due to the just-discussed differential contraction on cooling, this geometry will be effective in driving the shell into the concave cavity thus created. For maximum effectiveness, this concave outward geometry should be applied both along the length of the spoke and across its width to form a doubly-curved mating surface for the composite.

Retention of the shell on the spoke and good mechanical coupling between the alloy spoke and the composite shell may be further assured by bonding the polymer resin portion of the composite to the alloy surface of the spoke as it cures. This may require selection of a compatible polymer and suitable preparation of the spoke surface, for example by grit blasting, phosphoric acid anodizing, or silane coupling agent treatment to promote good adhesion. One exemplary resin is a bisphenol A-based epoxy resin with diethylenetriamine (DETA) aliphatic polyamine hardener, which may be partially cured or B-staged so that the resin and cross-linking agent have reacted only to the extent of producing a viscoelastic solid. Such a procedure may also be employed to secure a shell to the hub.

In a second embodiment also directed to a one-piece cast or forged aluminum wheel, a similar woven carbon fiber reinforced composite shell attached to the exterior, or customer-viewable, surface of the spoke shell may be attached to the interior, non-viewable surface of the spoke employing the same means of shell retention as for the exterior embodiment.

In a third embodiment, again suitable for a one-piece cast or forged aluminum a cavity-filling woven carbon fiber reinforced composite, shaped into the form of a rod, may be positioned, longitudinally, in a cavity located within the spoke and extending substantially the length of the spoke. As with the first embodiment the composite rod would be cured-in-place and the cavity surface treated appropriately to promote adhesion between the polymer and cavity surface.

These embodiments may also be combined so that a wheel spoke could incorporate all three embodiments or any two of the three embodiments and the practices described for application of stiffening shells to the front and rear of the wheel spoke may readily be adapted to apply such shells to one, other or both of the sides of the spoke. Side-positioned shells may be employed instead of, or in addition to the front and rear-mounted shells.

An additional combination embodiment could place shells on each of the front, rear and two sides of the spoke. Optionally such a spoke and shell configuration may be wrapped around its periphery by another woven carbon fiber reinforced composite layer. In this configuration all of the shells and the exterior wrap should be applied before the resin is cured. Further, so that the wrap may bond to the shells to provide maximum stiffening support, the wrap may be applied so that the resin originating from the wrap comingles with the resin from the shells before curing is initiated.

Each of these embodiments is also applicable to a multi-piece alloy wheel design in which the spokes are bolted, at one end, onto a central disk incorporating a bolt circle for attachment to a vehicle and bolted at the other end to a wheel rim. For multi-piece wheels it is anticipated that the woven carbon fiber reinforced composite would be applied to the spokes prior to wheel assembly but this is not necessary.

In a final embodiment, the front-located and rear-located reinforcing woven carbon fiber reinforced polymer shells may be applied to stamped high strength steel wheels. The desired recesses may be formed by stamping, but supplementary shaping operations, either machining or additional stamping operations, may be required to form the inwardly-facing flanges.

These and other aspects of the invention are described below, while still others will be readily apparent to those skilled in the art based on the descriptions provided in this specification.

BRIEF DESCRIPTION OF THE DRAWINGS

In FIG. 6A, only the section of the spoke is shown, illustrating cavities on each of the four sides of the spoke fiber, each cavity being bounded by a pair of inwardly inclined flanges. In FIG. 6B, the same spoke in cross-section is shown after a resin-impregnated woven carbon fiber reinforcement has been positioned and contained within each of the cavities. In FIG. 6C the spoke is shown with the spoke and its resin-impregnated woven fiber reinforcements wrapped with at least one layer of a continuous length of resin-impregnated woven carbon fiber. In FIG. 6D the spoke is shown wrapped in layered carbon fibers wound around the spoke perimeter. In FIG. 6E the spoke is shown wrapped in layered carbon fibers wound lengthwise around the spoke.

DESCRIPTION OF PREFERRED EMBODIMENTS

Figure 1:
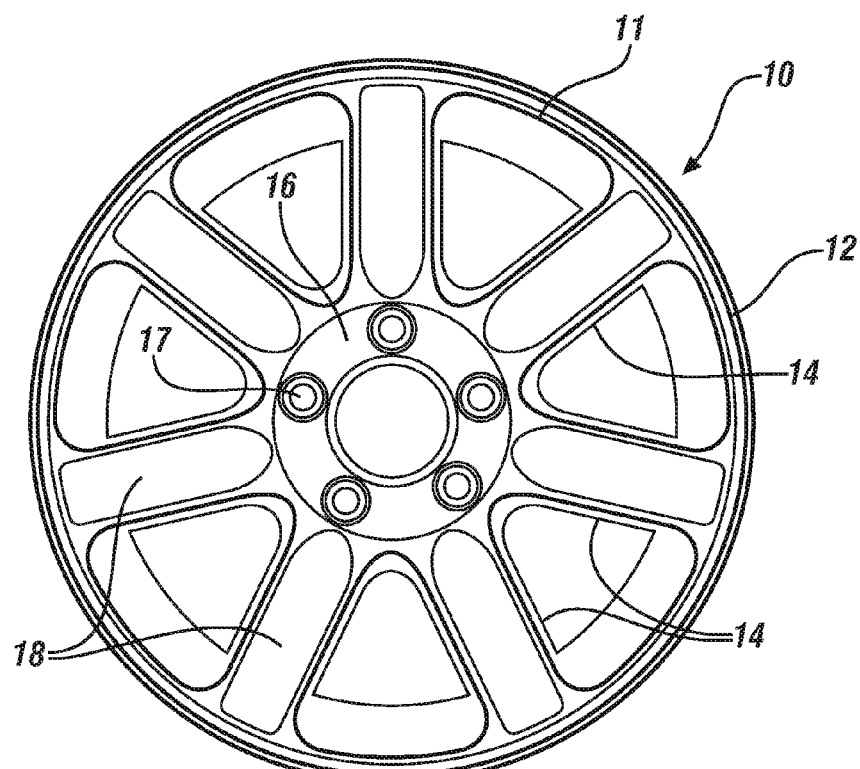
FIG. 1 depicts, in frontal view, an illustrative spoked alloy wheel, which may be adapted for practice of the invention.

Automobile and light truck wheel have traditionally been fabricated of steel weldments but, increasingly consumers are turning to cast or forged alloy or aluminum wheels, a representative example of which is shown, as 10, in FIG. 1. Suitably such wheels may be fabricated of aluminum 6061 or aluminum 5454 alloy. These aluminum wheels 10 may be fabricated as a unitary cast or forged body or as an assembled, usually bolted-together, multi-part unit consisting of a rim 12, a plurality of spokes 14 and a central disk or hub 16 with bolt circle 17 for attachment of the wheel to the vehicle. Often such wheels incorporate decorative or contrasting features. In the example shown in FIG. 1 these are shown as shallow pockets 18 incised into the front 11 or viewable surface of the spoke when the wheel is mounted on a vehicle.

Commonly, both unitary and assembled multi-piece wheels employ a small, less than ten or so, number of spokes, each of which may be several square inches in cross-sectional area and generally rectangular in cross-section. When cornering, the load imposed at the tire-road contact patch is transmitted to the hub as a bending load imposed on the spokes of the wheel bending and flexing the spokes.

Obviously wheel stiffness may readily be increased by increasing the moment of inertia of the spokes, or by increasing the number of spokes, but both approaches add mass to the wheel and may restrict access of cooling airflow to the brakes.

In this invention stiffening of the spokes is achieved by securing, to the face, reverse, side(s) or interior of the spoke, or any combination of these, a woven carbon fiber reinforced polymer body. To obtain the greatest stiffening effect the woven carbon fiber reinforced polymer body may be bonded to the wheel spoke and further secured by features in the wheel. These features are designed to mechanically interfere with the polymer body to ensure that the woven carbon fiber reinforced polymer body and the spoke are connected and will respond as a single body to any applied load. Many structural polymers, for example those based on a bisphenol A-based epoxy resin, will bond and strongly adhere to a suitably prepared aluminum alloy surface. Preferred surface preparation procedures to promote good polymer to aluminum adhesion include grit blasting or other abrasion processes, phosphoric acid anodizing, or the use of a silane coupling agent treatment.

Figure 2:
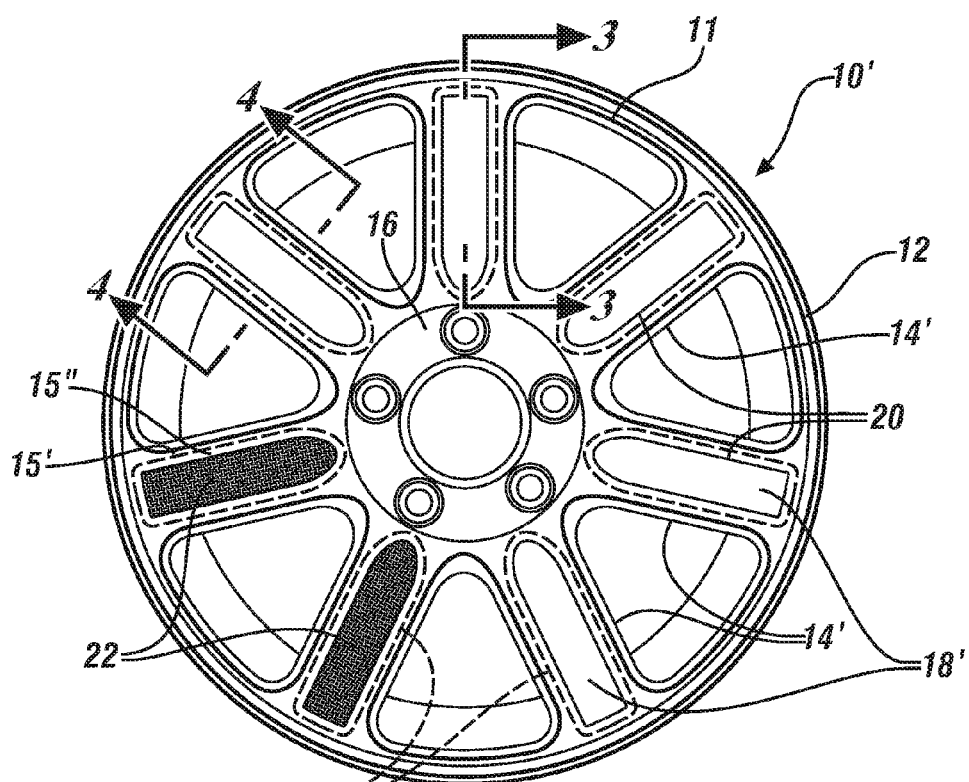
FIG. 2 depicts, in frontal view, the spoked alloy wheel of FIG. 1 illustrating design changes to render it suitable for practice of the invention.

The wheel shown in FIG. 1 may be readily adapted for practice of the invention as shown by wheel 10' in FIG. 2 by incorporating on spoke surface 15' a continuous inwardly-facing inclined flange 15" terminating in a perimeter 20 around incised cavity 18'. Some spokes are shown with a woven carbon fiber reinforced polymer shell 22 positioned and contained within cavities 18'.

Figure 3:
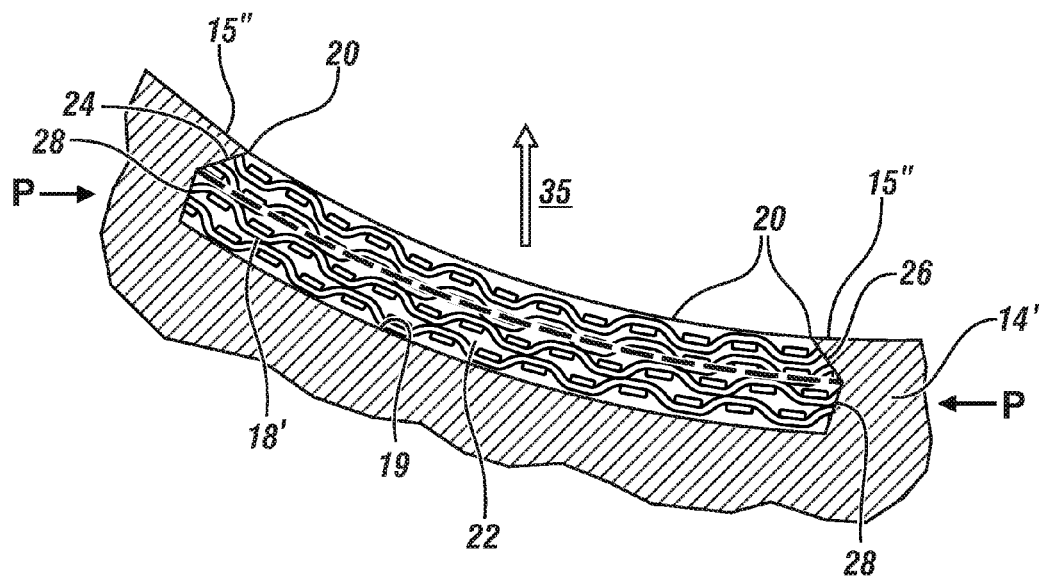
FIG. 3 depicts, in fragmentary view, a section through section 3-3 of FIG. 2 illustrating the concave outward geometry of the cavity in this section and the inwardly inclined retaining flanges for retention of a woven carbon reinforced polymer shell.
Figure 4:
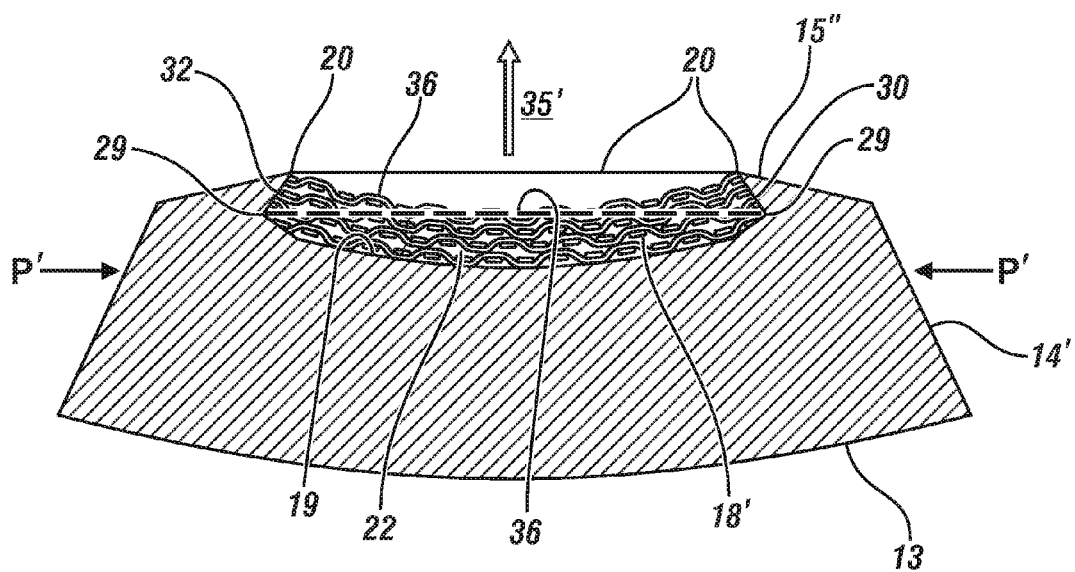
FIG. 4 depicts a section through section 4-4 of FIG. 2 illustrating the concave outward geometry of the cavity in this section and the inwardly inclined retaining flanges for retention of a woven carbon reinforced polymer shell.

The nature of flange 15" and cavity 18' may be better appreciated by the longitudinal (FIG. 3) and transverse (FIG. 4) sections through the spoke shown in FIGS. 3 and 4. Longitudinal section (FIG. 3) shows cavity 18' in spoke 14' (FIG. 2) filled with a woven carbon fiber reinforced polymer shell 22. Shell 22 may incorporate a plurality of such woven reinforcements arranged as a layered stack. The maximum extent of cavity 18' is shown by cavity boundary 28 and opposing segments 24 and 26 of inwardly-facing inclined flange 15" terminating in perimeter 20 are shown restraining removal of shell 22 from cavity 18'. As will be discussed further later, the bottom surface 19 of cavity 18' is curved and arranged as concave up in this (longitudinal) section.

In transverse section (FIG. 4), shell 22 fills cavity 18' in spoke 14'. Cavity 18' is bounded by inwardly-facing inclined flange 15" which extends from spoke front surface 15' and terminates in perimeter edge 20. Inner surfaces 30 and 32 of opposing inwardly-inclined flanges 15" serve to restrain removal of shell 22 from cavity 18', whose maximum lateral extent is shown at 29. Lower surface 19 of cavity 18' in transverse section is curved and arranged as concave up. The lower surface 19 of cavity 18' is therefore curved in two orthogonal directions and has a bowl-shaped form.

The re-entrant characteristics of flange 15" are not readily formed in a casting. A complex multipart die would be required to avoid a 'die lock' condition or a condition where the frozen metal would, by interfering with the die features, resist separation of the casting from the die. However, many alloy wheels, to achieve a desired appearance or to achieve mass balance, undergo extensive machining Inwardly facing inclined flange 15", or any geometry suitable for creating a mechanical interference between shell 22 and cavity 18' may be readily formed by machining. It is preferred that flange 15" or any like geometry be continuous around the perimeter 28 of cavity 18' but an interrupted or sectional flange may also be used.

An automobile and its wheels may be operated in ambient temperatures ranging from −40° C. to about 50° C. and in-service wheel temperatures may approach 100° C. This wide range of temperatures encountered in service is challenging because of the differences in the coefficients of thermal expansion of an epoxy-based woven carbon fiber reinforced polymer and aluminum. For the epoxy-based woven carbon reinforced polymer the coefficient of thermal expansion is about $2 \times 10^{-6}$/K, whereas the coefficient of thermal expansion for aluminum is about $22 \times 10^{-6}$/K.

Such a dramatic mismatch in thermal expansion could promote large interfacial stresses between the aluminum and an adhering reinforced epoxy shell, possibly leading to decohesion and separation of the shell and spoke. If separations did occur, the spoke and reinforced epoxy shell could respond to the bending load independently, rather than cooperatively, appreciably reducing the effectiveness of the epoxy shell in enhancing wheel stiffness.

To forestall opportunity for separation of shell and spoke, the wheel may be heated to an elevated temperature, suitable for curing the polymer, and greater than the highest anticipated in-service temperature. An exemplary but not limiting temperature of between 100 and 120° C. may be suitable. Once the wheel has reached the curing temperature, and the receiving cavity for the reinforced polymer shell has fully expanded, the polymer and reinforcement may be introduced into the cavity and cured. After curing is complete, reducing the wheel temperature will cause the size of the cavity to decrease as the wheel contracts. The polymer shell will also contract, but to lesser extent because of its lower coefficient of thermal expansion, so that the shell will be placed under compressive stress by the cooling wheel. This is indicated by the compressive loads P, P' shown on FIGS. 3 and 4. The magnitude of the compressive stress will vary, being greater at lower temperatures than higher, but because the cure temperature is selected to be greater than the highest expected in-service temperature of the wheel the shell will be under compressive stress under all in-service conditions. This will reduce the interfacial stresses generated between the aluminum spoke and the insert and ensure that the adhesive bond between insert and spoke is maintained over the service life of the wheel.

It may be noted that the difference in coefficient of thermal expansion between the woven carbon fiber-reinforced polymer is about $20 \times 10^{-6}$/K. To ensure retention of the shell, it is important that all stresses generated are elastic and not plastic since any plastic deformation would result in a permanent increase in the size of the cavity and reduce retention under future high temperature wheel operation. This requirement may be satisfied if:

$$\Delta\alpha\Delta T < \sigma/E$$

where: $\Delta\alpha$=difference in thermal expansion coefficient of the wheel and insert
$\Delta T$=difference in temperature between curing temperature and the lowest operating temperature of the wheel
$\sigma$=yield stress of wheel alloy
$E$=Young's modulus of wheel alloy.

For example, an aluminum wheel with a Young's modulus of about $10 \times 10^6$ psi containing an epoxy-based woven carbon fiber reinforced insert cured at 120° C. and operated at temperatures as low as −40° C. should be fabricated of an alloy with a minimum yield stress of about 32,000 pounds per square in (psi) or about 220 MPa (megapascals) to ensure that all stresses are elastic. An age hardenable aluminum 6061 alloy in a T6 temper would be suitable as would a 5454 aluminum alloy worked to an H34 temper.

To effectively induce the desired composite stress in the shell, the shell should completely fill the cavity at the curing temperature. But loading the woven reinforcement and the polymer precursor resin into the cavity is challenging because of the surrounding inwardly-facing flange. To enable ease of loading while assuring that the cavity is filled it is preferred that the woven reinforcement be cut repeatably to a predetermined size, inserted into the cavity and lightly tamped down to ensure that the cavity is filled. Typically a woven reinforcement layer or a stack comprising a plurality of woven reinforcement layers will be charged with the polymer precursor resin to form a prepreg. The woven reinforcement may be cut before stacking and charging with polymer precursor or multiple layers may be stacked, charged with polymer precursor and then cut. Suitably precise and repeatable techniques include die cutting and CNC controlled cutting machines. It may be desired to orient the topmost or visible woven reinforcing sheet in a particular fashion, for visual effect or to develop a particular set of properties. It will be appreciated that minimal tamping is preferred to avoid stretching or distorting the weave pattern of the topmost layer providing another motivation for a precisely and consistently dimensioned prepreg. Obviously similar considerations are also relevant to the application of a similar shell to the hub of the wheel.

Because the shell is under a compressive stress it may buckle. A flat sheet may buckle inwardly or outwardly and the buckling direction is usually a result of random minor imperfections and irregularities in the sheet which bias the buckling direction in one or the other direction. If shell 22 were to buckle outward, that is in the direction of arrows 35, 35' (FIGS. 3, 4) then it would apply a tensile stress to the interface between the insert and the underside of the cavity 19, 21 and again possibly lead to decohesion and separation. But in longitudinal section the insert is curved or pre-bowed, as a result of the concave configuration of cavity 18' in the longitudinal direction (FIG. 3), to ensure that any buckling will result in the insert being deflected into the cavity, thereby placing the insert-aluminum bond in compression and suppressing separation.

A similar practice may be followed in the transverse direction as shown in FIG. 4, but the shorter column length will render it less prone to buckling in the transverse direction. If it is preferred that the upper surface 36 of shell 22 adopt another configuration than that shown, it may be feasible to appropriately modify the cavity 18' geometry in the transverse direction without penalty to the long term durability of the shell-aluminum bond.

It is important in practice of this embodiment of the invention that wheel 10 reach the cure temperature before the resin of a resin-woven carbon fiber reinforcement cures. This permits cavity 18' to expand to its maximum dimension so that the heated expanded cavity may be filled with the prepreg to promote the desired compressive stress in the cured (composite) reinforcement. This may be accomplished by pre-heating the wheel to the cure temperature before charging the resin to the cavity. Alternatively, if the curing kinetics of the resin permit, it may be feasible to charge the resin and woven carbon fiber reinforcement to the cold wheel and directionally heat the wheel so that the wheel will heat before the resin. For example, if the rear (hidden) surface 13 of spoke 14' (FIG. 4) were exposed to radiant heating then the rapid conduction of heat through the aluminum compared to the slow conduction through the resin-woven carbon fiber reinforcement might enable the wheel to reach temperature sufficiently before the resin to enable the cavity to expand before curing was completed.

To enhance the decorative appearance of the shell, whether applied to the spokes or the hub, the prepreg may be cured while in contact with a shaped and polished die complementary to the desired surface shape of the shell (36 in FIG. 4). Alternatively the cured shell may be buffed or polished to impart a smooth and polished appearance to the shell. Preferably the polymer will be transparent so that the woven carbon fiber reinforcement may be viewed, but suitable additives may optionally be added to the precursor polymer resin to tint the polymer while retaining transparency or to render it opaque.

It will be appreciated similar practices may be followed to mount the shell on the reverse or hidden side of the spoke as well as on the sides of the spoke and that the practice is equally applicable to solid and channel-section wheel spokes. In fact, the stiffness of channel-section wheel spokes may be especially improved by side-mounted reinforcing shells.

Figure 5:
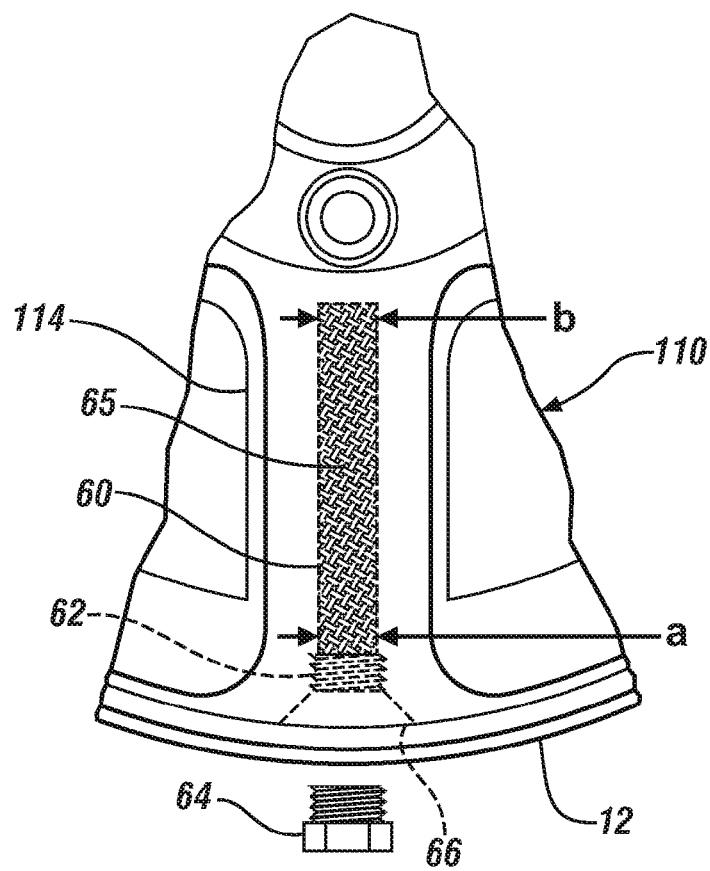
FIG. 5 depicts, in frontal view, a portion of a wheel similar to that shown in FIG. 1, but with a hollow, cylindrical cavity in the spoke, end-threaded to accept a sealing threaded plug, and filled with a reinforced woven carbon polymer composite.

A reinforcing core of a woven fiber reinforced composite using the approach shown in FIG. 5 which shows, in fragmentary view, a representative spoke 114 from a wheel 110, similar to that shown in FIG. 1. Here spoke 114 has an internal cavity 60, preferably cylindrical or tapered from rim to disc so that dimension 'b' is less than dimension 'a' for ease of charging the resin carbon fiber reinforcement to the cavity. Cavity 60 is closed on one end and threaded on the other end with threads 62 to threadably engage threaded plug 64. Cavity 114 and threads 62 are recessed into tapered recess 66 to avoid any interference with the tire.

In this embodiment the wheel would be preheated to the curing temperature, the cavity charged with a resin-impregnated woven carbon fiber reinforcement 65, possibly Z-folded or rolled into a generally tubular configuration, and compacted by screwing in tapered plug 64 to ensure that the cavity is fully filled with the resin-reinforcement. An appropriate compressive stress will arise on cooling the wheel from the curing temperature. Again, appropriate surface treatments may be applied to the walls of the cavity to ensure that the polymer adheres to the cavity walls and that the metal spoke and reinforcement deflect cooperatively for maximum increase in spoke stiffness.

Figure 6A:
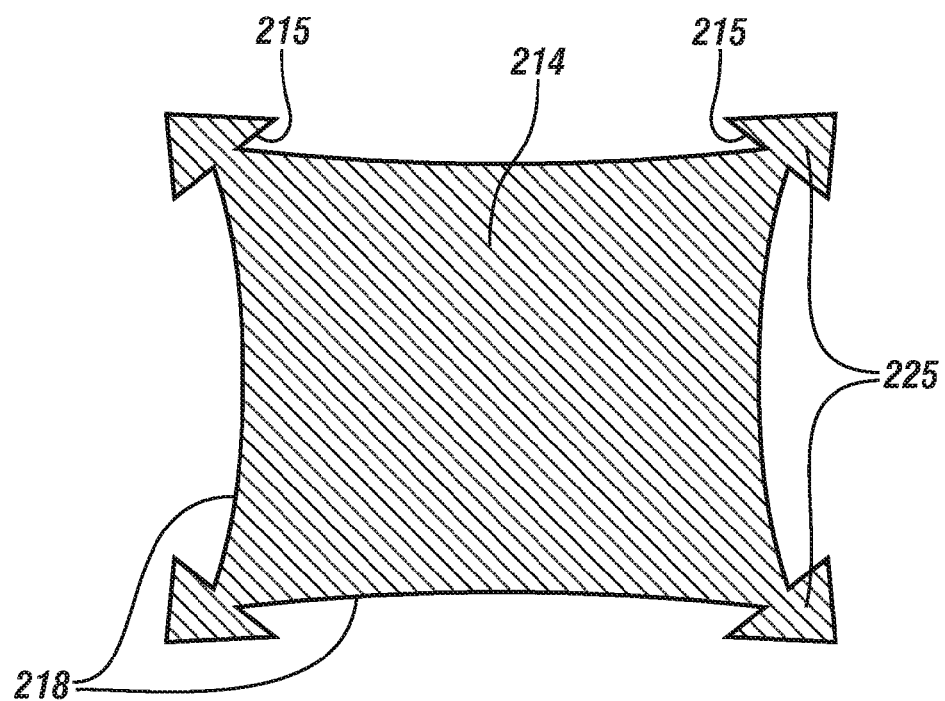
FIGS. 6A-E depict, in cross-section, a generally rectangular solid spoke of a wheel in several stages of application of an assemblage of woven carbon fiber stiffening reinforcements.
Figure 6B:
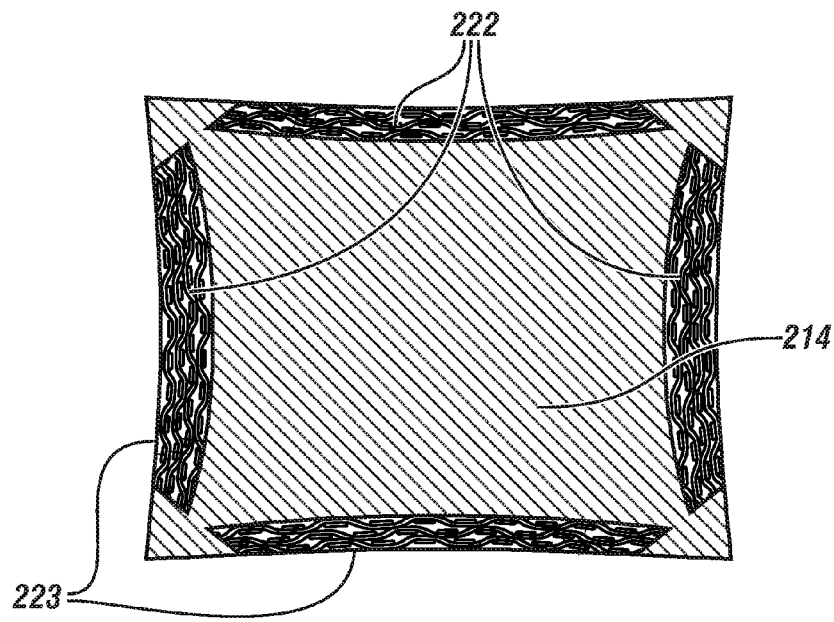
Figure 6C:
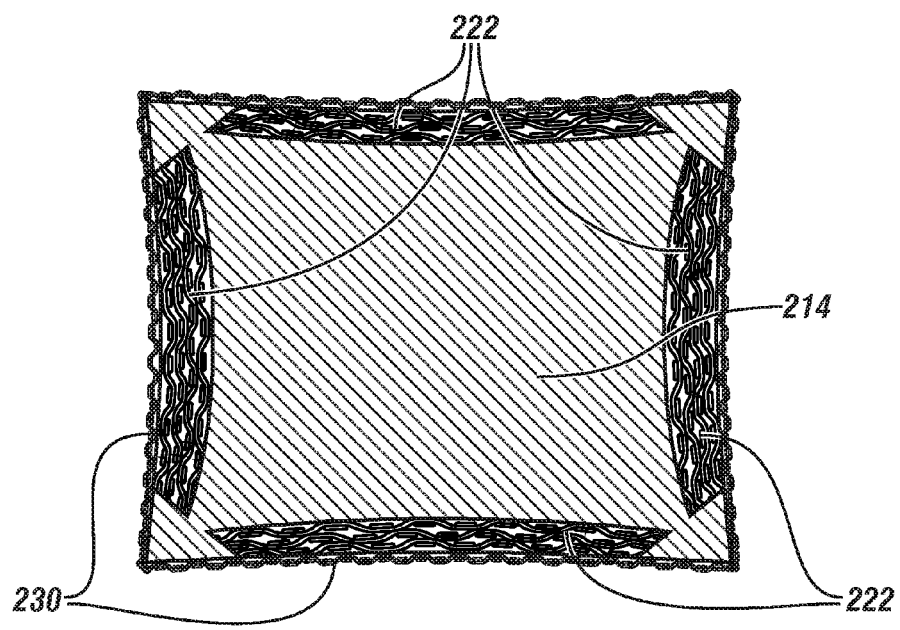

FIGS. 6A-C show an embodiment in which a plurality of woven carbon fiber reinforced polymer shells are to be applied to a solid spoke which is then wrapped in a length of woven carbon fiber reinforcement encasing both the exposed spoke portions and the stiffening shells. FIG. 6A shows the spoke 214, in cross-section. Each face has a cavity 218 with a concave-out curvature and, at the corners, inwardly-inclined flange portions 215 machined or otherwise formed from corner sections 225. The shape of each of cavities 218 along the length of the spoke, that is, in longitudinal section, will generally correspond to the section shown in FIG. 3.

Figure 6D:
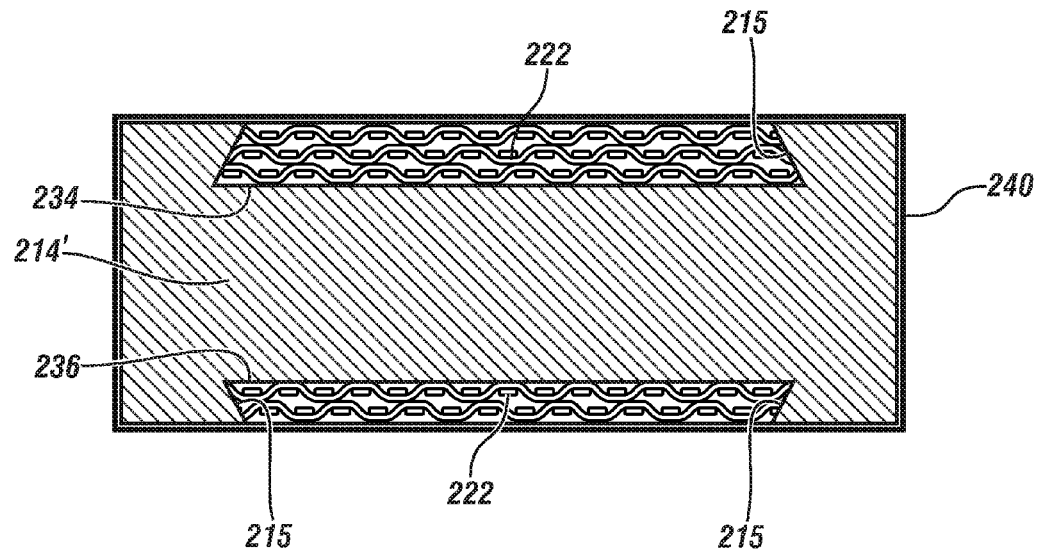
Figure 6E:
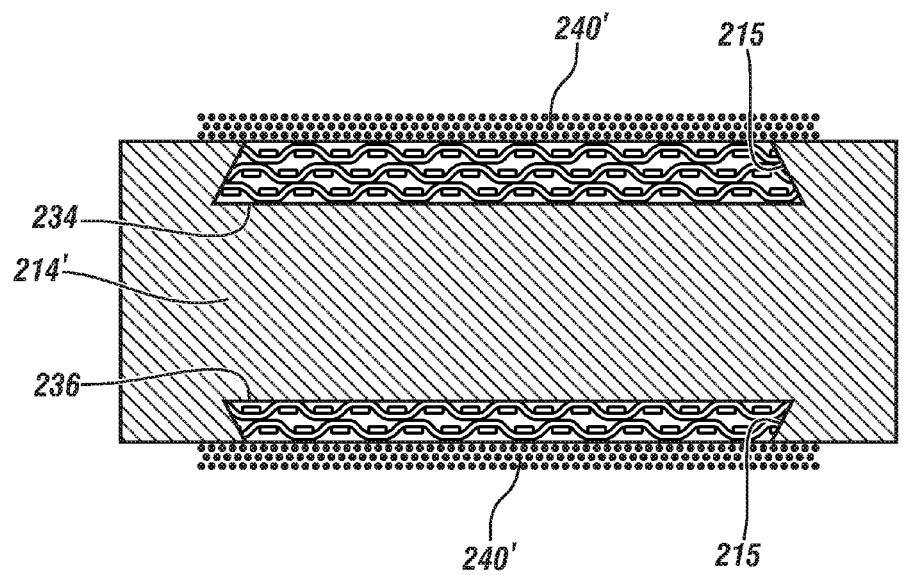

Each of cavities 218 of spoke 214 is charged with a woven carbon fiber reinforced polymer resin 222 to develop face 223 as shown in FIG. 6B and, before the polymer resin of woven carbon fiber reinforcement polymer resin 222 is cured, the entire periphery of the spoke is wrapped, over at least a portion of its length with a woven carbon fiber reinforcement polymer resin wrap 230 as shown in FIG. 6C. Preferably both woven carbon fiber reinforced polymer resin 222 and wrap 230 employ a common polymer system and hence a common resin. In application of the wrap 230 it should be positioned so that it is in intimate contact with each of reinforcements 222 across its entire face 223 (FIG. 6B) so that the resins of each mix and commingle. When cured, the wrap and reinforcement will be fully bonded so that the wrap is fully effective in supporting the insert. Although FIGS. 6A-6C depict a woven carbon fiber reinforced polymer resin 222 applied to all faces of spoke 214, beneficial increases in spoke stiffness will result even if woven carbon fiber reinforced polymer resin 222 is applied to only one, two or three faces of the spoke. For example for the spoke 214' shown in section in FIGS. 6D and 6E provision is made for only two cavities 234, 236. The cavities may have different volumes. For example, in each of FIGS. 6D-E, cavity 234 can accommodate more fabric layers 222 than cavity 236. In both cases the fabric layers are retained by re-entrant features 215 as well as by wound carbon fibers 240 (FIG. 6D) and 240' (FIG. 6E). Note that the transversely wound fibers 240, because of their orientation relative to the bending axis, will make little contribution to spoke stiffness. Where the spoke design permits longitudinally wound fibers 240' (FIG. 6E), the fibers will contribute to spoke stiffness as well as serve to retain the woven inserts.

The invention has been described with respect to cast or forged aluminum wheels but the practice of the invention is also applicable to wheels fabricated of other cast metals, for example magnesium alloys, and even to steel wheels fabricated of stampings, provided adhesion and retention of the woven carbon fiber reinforced polymer plate or insert may be assured.

The invention claimed is:

1. A metal automobile wheel comprising a coaxial hub and a rim, the hub and rim being maintained in radially spaced apart relation by a plurality of elongated spokes, each of the spokes having a common length and an exterior surface, the spokes being angularly offset from one another and being attached at a first end to the wheel hub and at a second end to the wheel rim, each of the spokes comprising one or more fiber reinforced polymer inserts, each of the one or more fiber reinforced polymer inserts being bonded to, and retained in, a cavity with a concave bottom surface extending inwardly from the spoke exterior surface, each of the cavities being bounded by a continuous or interrupted, inclined, inwardly-extending wall overhanging the concave bottom surface of the cavity to mechanically engage and retain the fiber reinforced polymer insert.

2. The metal automobile wheel of claim 1 in which the fiber reinforced polymer insert comprises a woven fiber reinforcement.

3. The metal automobile wheel of claim 1 in which the fiber reinforced polymer insert comprises a plurality of reinforcing woven fiber layers stacked atop one another to form a layered reinforcement.

4. The metal automobile wheel recited in claim 2 in which the woven fiber reinforcement comprises carbon fibers.

5. The metal automobile wheel recited in claim 1 in which the spoke is wrapped by a second fiber reinforced polymer overlying the spoke exterior surface, the one or more inserts, and the one or more cavities.

6. The metal automobile wheel recited in claim 1 in which the metal is one of an aluminum alloy, a magnesium alloy and steel.

7. The metal automobile wheel recited in claim 1 in which the spokes comprise a closed interior volume with walls, the volume being at least partially filled by the reinforced polymer, the reinforced polymer being bonded to the closed interior volume walls.

8. The metal automobile wheel recited in claim 1, in which the fiber reinforced polymer insert is under compressive stress.

9. A metal automobile wheel comprising a hub and a rim, the hub and rim being connected by a plurality of spokes, each of the spokes being reinforced by a polymer-infiltrated, layered, woven carbon fiber reinforcement to provide additional stiffness, the spoke extending from the hub to connect the hub to the rim and thereby define a spoke length;

each of the rim, hub and spokes having a visible exterior surface when the wheel is mounted on an automobile;
each of the spokes having a cavity with a concave bottom surface extending inwardly from the spoke visible exterior surface, the cavity extending over substantially the length of the spoke and being bounded by a cavity wall, the concave cavity bottom surface and cavity wall defining a cavity volume;
the wall being inclined and inwardly-extending to overhang the concave bottom surface of the cavity to mechanically engage and retain the reinforced polymer, the wall partially restricting access to the cavity;
each cavity volume being filled with the polymer-infiltrated layered polymer reinforcement which engages and is bonded to the concave-bottom cavity surface and cavity wall, the polymer-infiltrated woven carbon fiber layered reinforcement being subjected to a compressive stress.

10. The metal automobile wheel of claim 9 in which the infiltrated polymer is at least partially transparent so that the woven fiber reinforcement is visible.

11. The metal automobile wheel of claim 9 in which the metal wheel comprises an aluminum alloy.

12. The metal automobile wheel of claim 11 in which the aluminum alloy is Aluminum Association alloy 6061 heat treated to a T6 condition.

13. The metal automobile wheel of claim 9 in which the polymer is a cured bisphenol A-based epoxy resin with diethylenetriamine (DETA) aliphatic polyamine hardener.

14. The metal automobile wheel of claim 9 in which the metal has a yield strength of more than about 220 MPa.

\* \* \* \* \*